(12) United States Patent
Wilson et al.

(10) Patent No.: US 6,439,521 B1
(45) Date of Patent: Aug. 27, 2002

(54) SUPPORT APPARATUS FOR A STROLLER

(76) Inventors: Michael L. Wilson; Phyllis J. Wilson, both of 566 Palisade, Camden, AR (US) 71701

( * ) Notice: Subject to any disclaimer, the term of this patent is extended or adjusted under 35 U.S.C. 154(b) by 0 days.

(21) Appl. No.: 09/735,582

(22) Filed: Nov. 12, 2000

(51) Int. Cl.[7] .................. A47B 96/00; A47K 1/00; A47K 5/00; E04G 5/06; F16L 3/08; F21V 21/00; F21V 35/00

(52) U.S. Cl. ................ 248/227.3; 248/227.6; 248/228.7; 248/226.11; 248/298.1

(58) Field of Search .................. 248/227.3, 228.6, 248/228.7, 226.11, 298.1, 287.1, 316.8, 316.1, 540; 211/117, 98, 102, 103, 187, 207

(56) References Cited

U.S. PATENT DOCUMENTS

| | | | | |
|---|---|---|---|---|
| 122,370 A | * | 1/1872 | Doolittle | 248/540 |
| 558,296 A | * | 4/1896 | McDonald | |
| 858,140 A | * | 7/1907 | Beaton | 248/57 |
| 4,277,224 A | | 7/1981 | Lundgren | |
| 4,687,414 A | | 8/1987 | Wardy | |
| 4,705,491 A | * | 11/1987 | Andersson | 464/167 |
| 5,092,549 A | * | 3/1992 | Beech | 248/103 |
| D328,949 S | | 8/1992 | Rodrigue, Jr. | |
| 5,397,268 A | | 3/1995 | Chang et al. | |
| D384,144 S | | 9/1997 | DuBois | |
| 5,671,900 A | * | 9/1997 | Cutler | 248/451 |
| 5,725,356 A | | 3/1998 | Carter | |
| 5,836,327 A | * | 11/1998 | Davis | 134/16 |
| 5,837,167 A | | 11/1998 | Lederer | |
| 5,965,067 A | | 10/1999 | Junkel et al. | |
| 5,979,857 A | * | 11/1999 | Holm | 248/451 |
| 5,984,418 A | * | 11/1999 | McInturff | 297/440 |
| 6,027,137 A | | 2/2000 | Rura | |

* cited by examiner

Primary Examiner—Leslie A. Braun
Assistant Examiner—Amy J. Sterling
(74) Attorney, Agent, or Firm—Dale J. Ream

(57) ABSTRACT

An apparatus for use with a baby stroller for supporting a cooling device, such as a fan or spray bottle, so as to cool a baby sitting therein. The support apparatus includes an elongate first support rod having a C-shaped clamp for coupling the first support rod to a stroller support member. The first support rod defines an elongate slot and a second C-shaped clamp movable therealong for coupling the first support member to another stroller support member. A length-adjustable support assembly is pivotally coupled to an end of the first support rod and includes telescopic sleeves. A second support rod is coupled to an upper end of the support assembly and is vertically displaced from the first support rod when the support assembly is pivotally positioned normal to the first support rod. The second support rod includes a third C-shaped clamp for snappably receiving a cooling device.

18 Claims, 5 Drawing Sheets

SUPPORT APPARATUS FOR A STROLLER

BACKGROUND OF THE INVENTION

This invention relates generally to an attachment for a baby stroller or carriage and, more particularly, to an apparatus which may be removably attached to a stroller for holding a cooling device at a selected position relative to a baby seated in the stroller.

While parents enjoy going for an outdoor walk while pushing their infant in a baby stroller, this activity is often uncomfortable to the infant during the heat of the day, especially in particularly hot or humid climates. Various devices have been proposed in the art for cooling a person's body, such as portable fans, spray bottles, or some combination of these cooling devices. Although assumably effective for their intended purposes, these devices are not useful for cooling a baby in a stroller without constant adult involvement.

Therefore, it is desirable to have an apparatus that may be removably coupled to a stroller and selectively configured by a person such that a clamp suitable for receiving a cooling device may be positioned a desired distance from an infant sitting in the stroller.

SUMMARY OF THE INVENTION

An apparatus for use with a baby stroller for supporting a cooling device a distance from an infant sitting in the stroller includes an elongate first support rod having first and second ends and defining a slot extending longitudinally between points spaced from the ends, respectively. A first C-shaped clamp is pivotally coupled to the first support rod adjacent the first end thereof such that the first end may be snappably coupled to a frame member of a baby stroller. A second C-shaped clamp includes threads that mate with a fastener extending through the slot. Therefore, the second clamp may be slidably moved along the course of the slot and frictionally tightened at a desired position so that the second clamp may be snappably coupled to another stroller support member.

A first sleeve of a length-adjustable support assembly is pivotally coupled to the second end of the first support rod. The support assembly also includes a plurality of additional sleeves that are telescopically received in the first sleeve. The support assembly may be pivotally moved between a first storage configuration adjacent and parallel to the first support rod and a second use configuration upwardly extending from and normal to the first support rod. The support assembly may also be adjusted to a plurality of configurations between the storage and use configurations, as desired. The additional sleeves are individually telescopically extensible to a desired height. A first end of a second support rod is pivotally coupled to the end of an uppermost additional sleeve and is rotatable about an imaginary axis defined by the support assembly. A third C-shaped clamp is pivotally coupled to a second end of the second support rod for snappably receiving a cooling device therein, such as a portable fan, spray bottle, or the like.

Therefore, a general object of this invention is to provide an apparatus for attachment to a stroller which can hold a cooling device a selected distance from an infant sitting in the stroller.

Another object of this invention is to provide a support apparatus, as aforesaid, which may be removably attached to strollers of various constructions.

Still another object of this invention is to provide a support apparatus, as aforesaid, which provides lateral, longitudinal, and height adjustment for supporting a cooling device at a desired configuration.

Yet another object of this invention is to provide a support apparatus, as aforesaid, that is easy to install and remove from a stroller.

A further object of this invention is to provide a support apparatus, as aforesaid, that is simple and economical to manufacture.

A still further object of this invention is to provide a support apparatus, as aforesaid, that is collapsible for storage.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
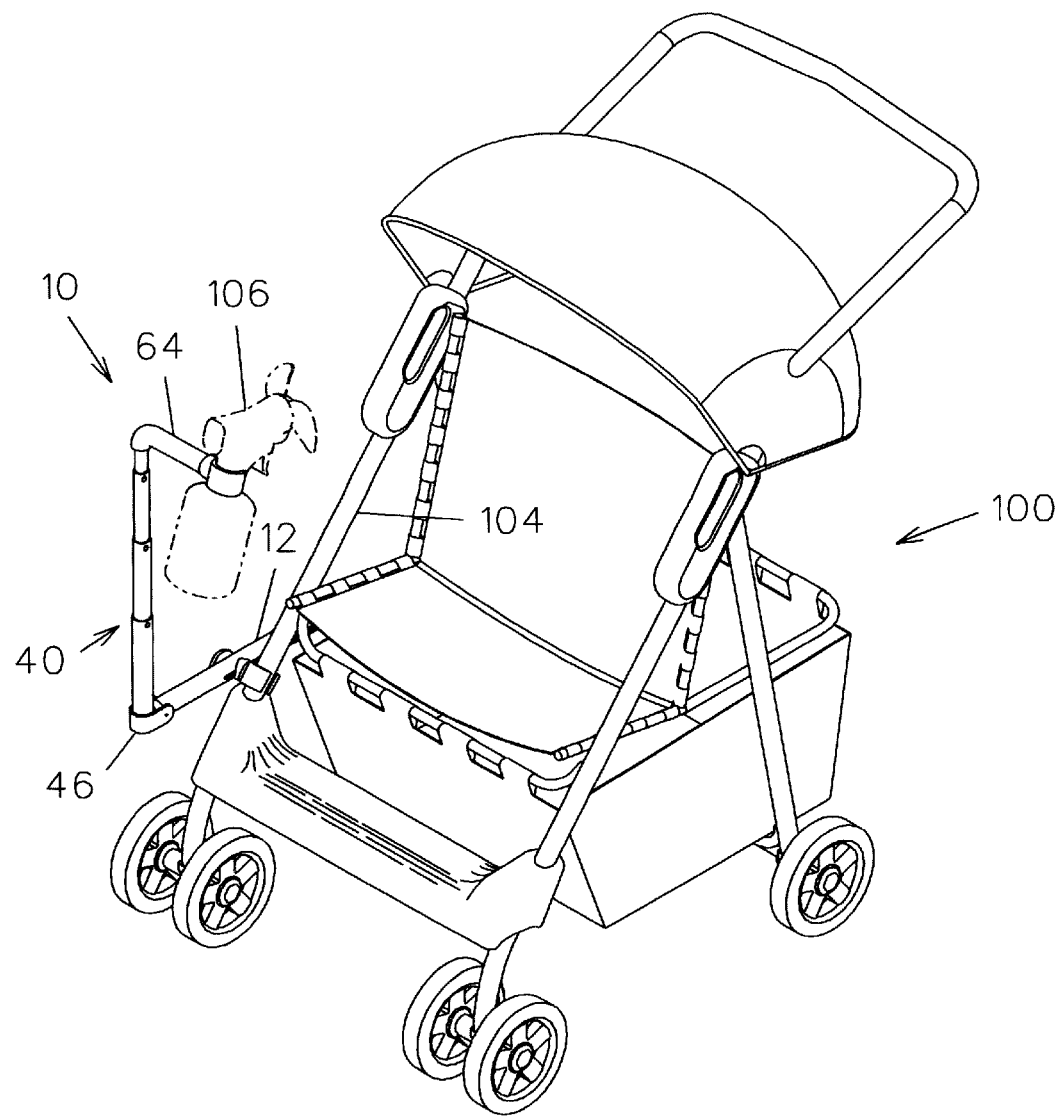
FIG. 1 is a perspective view of a support apparatus according to the preferred embodiment of the present invention attached to a baby stroller.

An apparatus 10 for use in conjunction with a baby stroller 100 adapted to support a cooling device 106 will now be described with reference to FIGS. 1–5 of the accompanying drawings. The apparatus 10 includes an elongate tubular first support rod 12 having first 14 and second 16 ends. The first support rod 12 includes a durable, molded plastic construction. A first clamp 18 includes a first base 20 fixedly attached to the first support rod 12 adjacent the first end 14 thereof. A first C-shaped annulus 22 is pivotally coupled to the first base 20 with a pin 24 or other axle for rotation about an imaginary axis normal to the first support rod 12. The first C-shaped annulus 22 is configured to be snappably coupled to a frame or support member and, preferably, to a rear frame member 102 of a conventional baby stroller 100.

The first support rod 12 defines an elongate slot 26 extending between endpoints displaced from first 14 and second 16 ends of the first support rod 12. The slot 26 extends entirely through the first support rod 12 along its longitudinal extent. A second clamp 28 includes a second base 30 having front and rear ends. A second C-shaped annulus 32 is pivotally coupled to the front end of the second base 30 with a pin 34 such that the second annulus may rotate about an imaginary axis created by the pin 34 and normal to the first support rod 12. The rear end of the second base 30 is threaded so that a fastener 36, such as a knob, extending through the slot 26 may threadably mate therewith. The second annulus 32 is configured to be snappably coupled to a frame or support member and, preferably, to a front frame member 104 of a conventional stroller 100.

Therefore, the second clamp 28 may be slidably moved along the longitudinal extent of the slot 26 when the fastener 36 is loosened relative to the second base 30. Conversely, the second clamp 28 may be held at a desired position along the slot 26 when the fastener 36 is threadably tightened relative to the second base 30 with the first support rod 12 sandwiched therebetween (FIG. 3).

Figure 3:
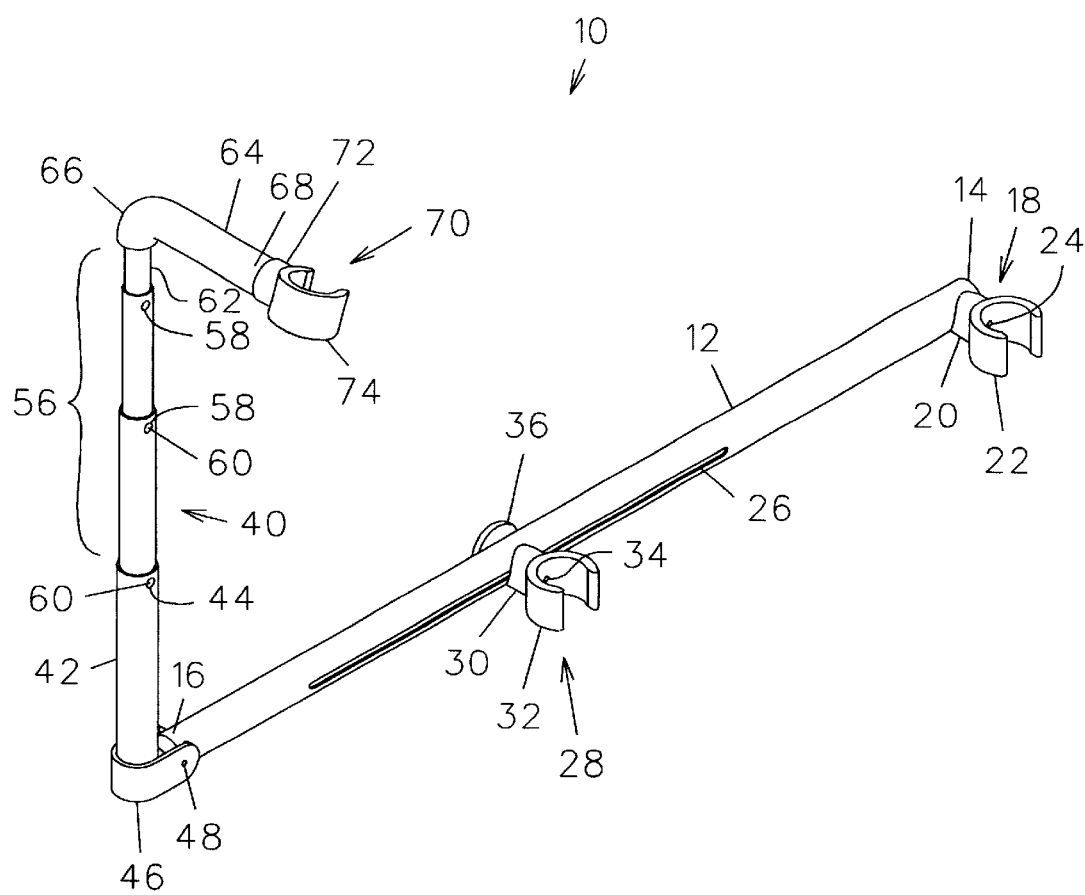
FIG. 3 is a perspective view of the support apparatus as in FIG. 1 removed from the stroller and in an extended use configuration.
Figure 4:
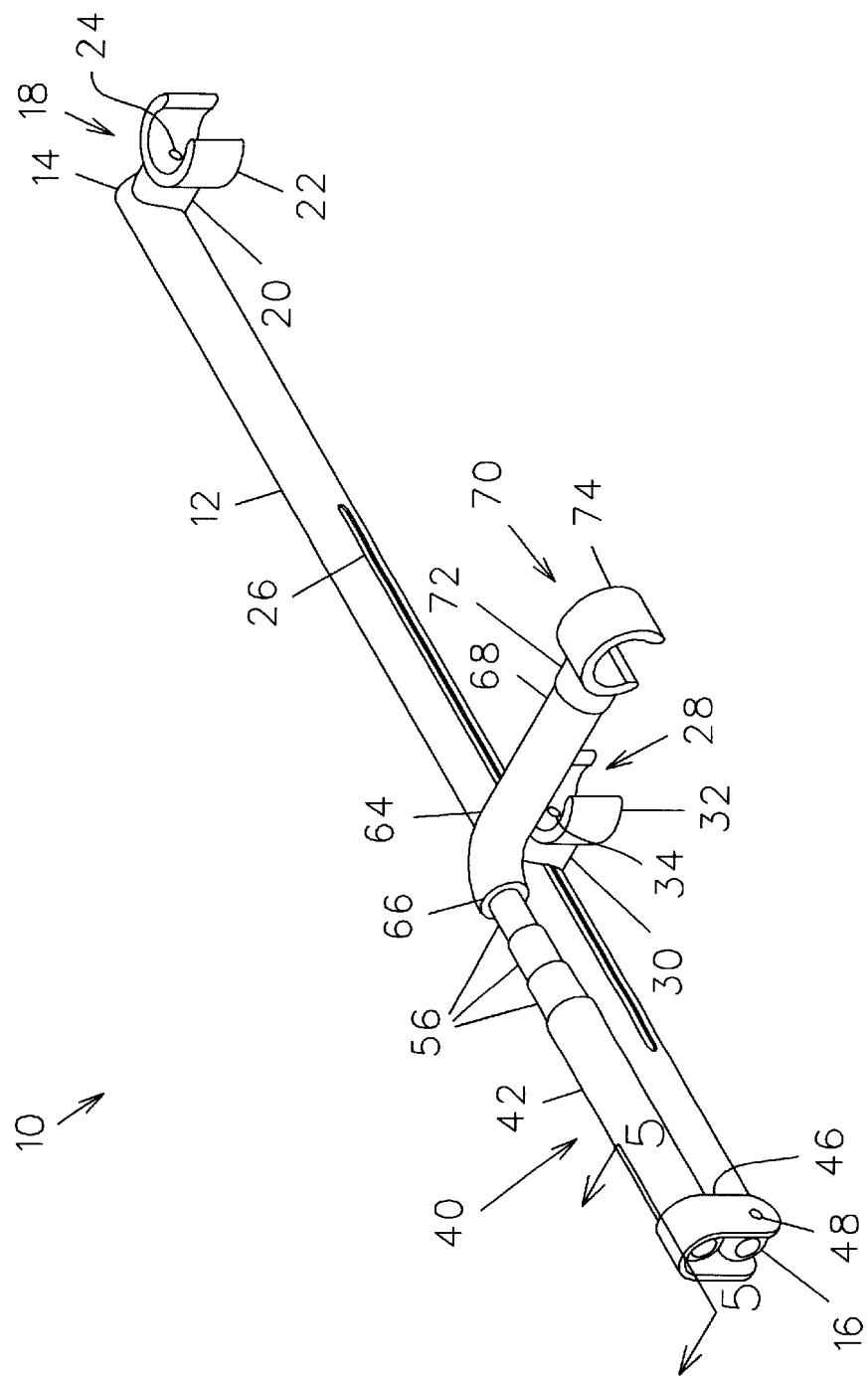
FIG. 4 is a perspective view of the support apparatus as in FIG. 1 removed from the stroller and in a retracted storage configuration.
Figure 5:
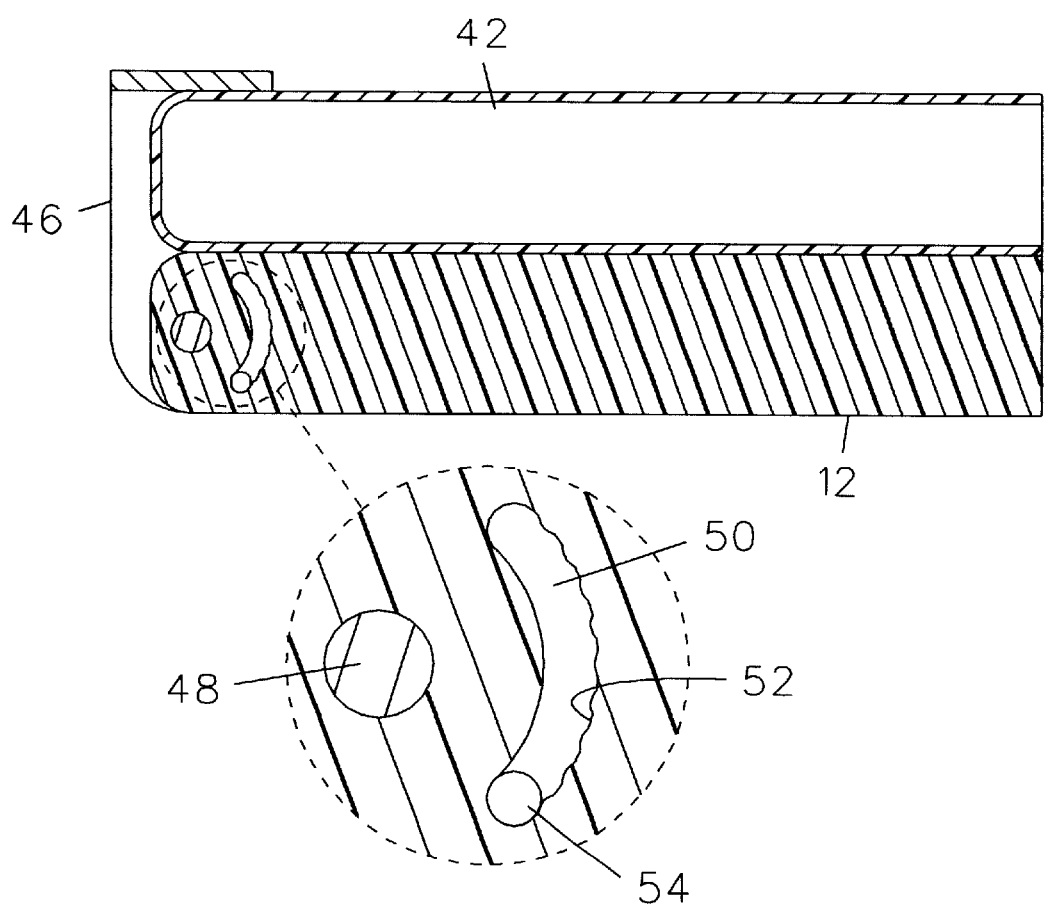
FIG. 5 is a sectional view of the support apparatus taken along line 5—5 of FIG. 4 with an isolated view of an axle and positioning channel on an enlarged scale.

A tubular first sleeve 42 of an adjustable-length support assembly 40 is pivotally coupled to the second end 16 of the first support rod 12 with a U-shaped bracket 46 (FIG. 3). A lower portion of the side wall of the first sleeve 42 is fixedly attached to an annular portion of the bracket 46. An axle 48 extends between free ends of the bracket 46 and through the first support rod 12 at the second end 16 thereof such that the bracket 46 may be operated like a hinge. Thus, the support assembly 40 is pivotally movable between a first storage configuration lying adjacent and parallel to the first support rod 12 (FIG. 4) and a second use configuration normal to the first support rod 12 (FIG. 3). As shown in FIG. 5, opposed portions of the tubular side wall of the first support rod 12 define an annular channel 50, the channel including a plurality of notches 52 on at least one edge. A guide bar 54 extends between interior surfaces of the bracket 46 and is configured to mate with the annular channel 50. The guide bar 54 is slidably movable along the annular channel 50 over the notches 52 as the bracket 46 is moved between first and second configurations. It should be appreciated that guide bar 54 may rest between any two adjacent notches 52 so as to hold the first sleeve 42 in a plurality of selected configurations.

A plurality of additional sleeves 56 are telescopically received within the first sleeve 42 and are slidably movable relative to one another between retracted and extended configurations. The first sleeve 42 defines an aperture 42 adjacent an upper edge thereof. Each of the additional sleeves 56 likewise defines apertures 58 adjacent top edges thereof, except for the uppermost additional sleeve 62. Each additional sleeve 56 includes a spring-loaded flange 60 adjacent a bottom edge thereof positioned so as to mate with a respective aperture 44, 58 on either the first sleeve 42 or a respective additional sleeve 56, as the case may be. It should be appreciated that the support assembly may alternatively be of unitary construction rather than of a telescopic construction.

The apparatus 10 includes a tubular second support rod 64. A first end of the second support rod 64 includes an elbow coupling 66, the open end of which presents a diameter slightly larger than a diameter of the free end of the uppermost additional sleeve 62. Therefore, the open first end 66 of the second support rod 64 frictionally receives the free end of the uppermost additional sleeve 62 and is adapted to rotate axially thereabout, as desired by a user (FIG. 3). A third clamp 70 includes a tubular open-ended base 72 having a diameter slightly larger than a diameter of a second end 68 of the second support rod 64 and is frictionally coupled thereto. A third C-shaped annulus 74 is fixedly attached to the third base 72 and rotates with the third base 72 upon user movement about an axis established by the second support rod 64.

Figure 2:
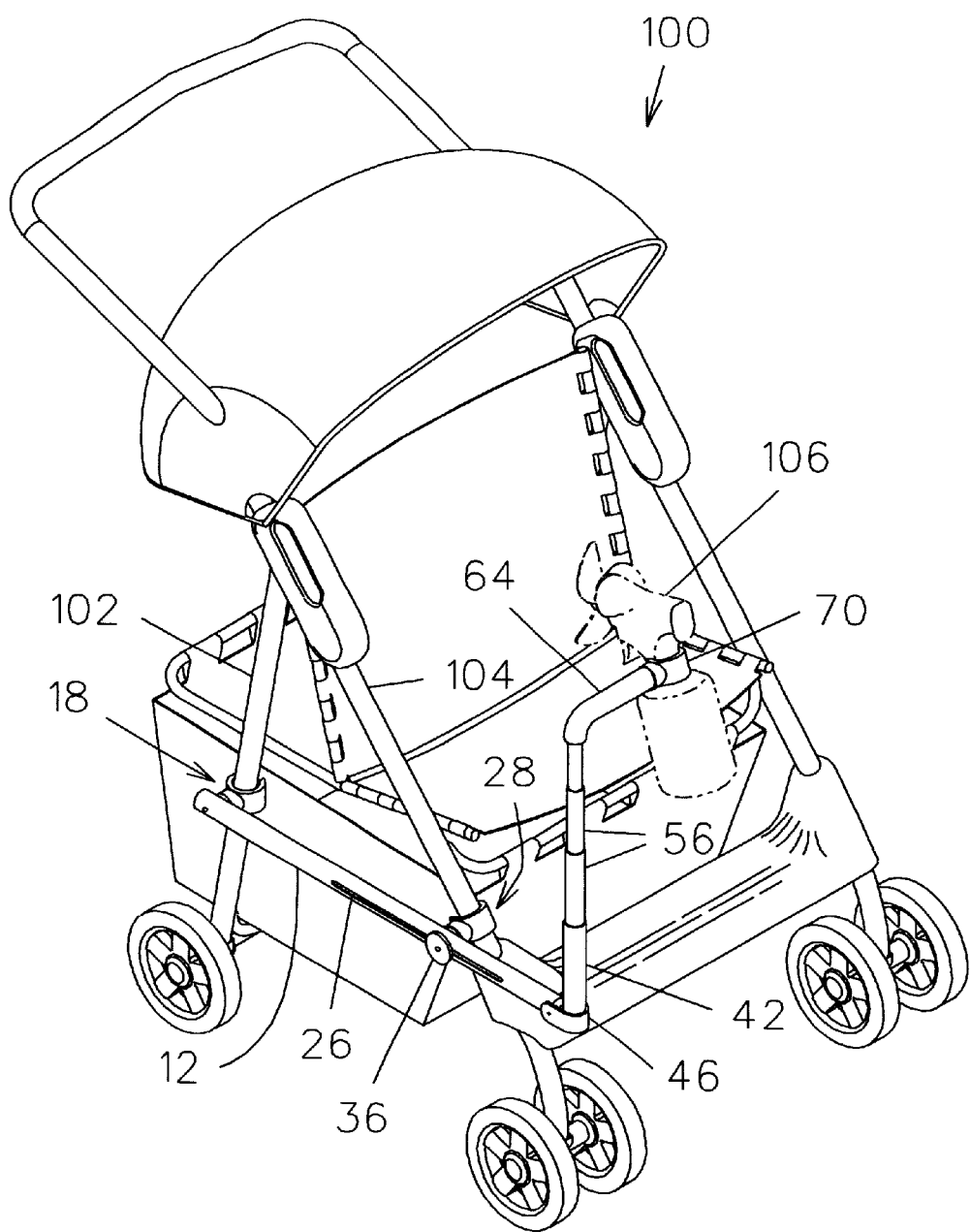
FIG. 2 is another perspective view of the support apparatus as in FIG. 1.

In use, the first clamp 18 extending from the first end 14 of the first support rod 12 may be snappably coupled to a rear frame member 102 of a conventional baby stroller 100 (FIG. 2). The first support rod 12 may then be oriented forwardly in a horizontal configuration or angled, as desired. The knob fastener 36 may then be loosened to allow the second clamp 28 to be slidably moved within the slot 26 until aligned with a front frame member 104 for attachment. The second clamp 28 may be snappably coupled to the front frame member 104. The support assembly 40 may be pivotally moved to the use configuration (FIG. 3) or any of a plurality of intermediate configurations between the storage and use configurations. The additional sleeves 56 of the support assembly 40 may be telescopically extended so as to adjust the height of the apparatus 10. The second support rod 64 may be rotated about the axis of the support assembly 40 and the third clamp 70 may be pivoted about the axis of the second support rod 64. The third clamp 70 is configured to snappably receive a cooling device 106, such as a fan, spray bottle, or the like.

Accordingly, it can be seen that the stroller support apparatus 10 is constructed to be removably attached to strollers of various dimensions and to hold a cooling device in a plurality of user selected positions.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. An apparatus for use in conjunction with a baby stroller and adapted to support a cooling device a distance from said stroller, said apparatus comprising:
   an elongate first support rod having first and second ends, said first end adapted to be pivotally coupled to a frame member of a baby stroller;
   wherein said first support member defines an elongate slot extending longitudinally therealong between opposed points spaced from said first and second ends, respectively, of said first support member;
   a second clamp having a C-shaped configuration for removable engagement with another frame member of said baby stroller in a snap-fit relationship;
   means coupled to said second clamp and extending through said slot for slidably moving said second clamp between user-selected positions therealong, said positioning means adapted to releasably hold said second clamp at a respective user-selected position;
   a length adjustable support assembly having a first sleeve pivotally coupled to said second end of said first support rod and a plurality of additional sleeves telescopically received in said first sleeve, said additional sleeves slidably movable between retracted and extended configurations; and
   a second support rod having a first end pivotally coupled to a respective additional sleeve and a second end adapted to removably receive a cooling device, said second support rod being vertically displaced from said first support rod.

2. The apparatus as in claim 1 further comprising a first clamp pivotally coupled to said first end of said first support rod, said first clamp having a C-shaped configuration for removable engagement with said frame member of said baby stroller in a snap-fit relationship.

3. The apparatus as in claim 2 wherein said first clamp includes a base fixedly attached to said first end of said first support rod and a C-shaped annulus pivotally coupled to said base for rotation about an imaginary axis normal to said first support rod.

4. The apparatus as in claim 1 wherein said second clamp includes a base and a C-shaped annulus pivotally coupled to said base for rotation about an imaginary axis normal to said first support rod, said base of said second clamp adapted to mate with said positioning means in a threaded friction fit relationship.

5. The apparatus as in claim 1 wherein said first sleeve of said support assembly is fixedly attached to a U-shaped bracket pivotally coupled to said second end of said first support rod, whereby said support assembly is hingedly movable between a first configuration parallel and adjacent to said first support rod and a second configuration normal to said first support rod.

6. The apparatus as in claim 5 wherein said first support rod defines an annular channel adjacent said second end thereof with a plurality of notches therealong, said bracket including a bar extending between opposed sides of said bracket and being in communication with said channel, said bar being slidably movable over said notches along said channel whereby to releasably position said support assembly in a user-selected configuration.

7. The apparatus as in claim 1 further comprising a third clamp pivotally coupled to said second end of said second support rod and adapted to releasably receive a cooling device in a snap-fit relationship, whereby to selectively cool an infant seated in said baby stroller.

8. An apparatus for use in conjunction with a baby stroller and adapted to support a cooling device a distance from said stroller, said apparatus comprising:
   an elongate first support rod having opposed first and second ends;
   a first clamp pivotally coupled to said first end of said first support rod and adapted to removably couple said first support rod to a support member of a baby stroller, said first clamp having a base fixedly attached to said first end of said first support rod and a C-shaped annulus pivotally coupled to said base for rotation about an imaginary axis normal to said first support rod;
   a length-adjustable support assembly having a first sleeve pivotally coupled to said second end of said first support rod and a plurality of additional sleeves telescopically received in said first sleeve;
   means for holding said additional sleeves in user-selected positions relative to respective adjacent additional sleeves or said first sleeve;
   a second support rod having a first end coupled to an upper end of said additional sleeves and a second end, said second support rod being vertically displaced from said first support rod; and
   a second clamp pivotally coupled to said second end of said second support rod and adapted to removably receive a cooling device, whereby to selectively cool a baby seated in said stroller.

9. The apparatus as in claim 8 wherein said first sleeve of said support assembly is fixedly attached to a U-shaped bracket that is pivotally coupled to said second end of said first support rod, whereby said support assembly is hingedly movable between a first configuration parallel and adjacent to said first support rod and a second configuration normal to said first support rod.

10. The apparatus as in claim 9 wherein said first support rod defines an annular channel adjacent said second end thereof with a plurality of notches therealong, said bracket including a bar extending between opposed sides of said bracket and being in communication with said channel, said bar being slidably movable over said notches along said channel, whereby to releasably position said support assembly in a user-selected configuration.

11. The apparatus as in claim 8 wherein said second clamp includes a base fixedly attached to said second end of said second support rod and a C-shaped annulus pivotally coupled to said base for rotation about an imaginary axis normal to said second support rod.

12. The apparatus as in claim 8 wherein said first support member defines an elongate slot extending longitudinally therealong between opposed points spaced from said first and second ends, respectively, of said first support member, said apparatus further comprising:
   a third clamp having a C-shaped configuration for removable engagement with another support member of said baby stroller in a snap-fit relationship; and
   a fastener coupled to said third clamp and extending through said slot for slidably moving said third clamp therealong, said fastener adapted to releasably hold said third clamp at a user-selected position for engagement with said another support member.

13. The apparatus as in claim 12 wherein said third clamp includes a base and a C-shaped annulus pivotally coupled to said base for rotation about an imaginary axis normal to said first support rod, said base of said third clamp adapted to threadably mate with said fastener in a friction fit relationship.

14. The apparatus as in claim 8 wherein said holding means includes:
   an aperture defined by said first sleeve adjacent an upper end thereof;
   an aperture defined by each additional sleeve adjacent respective upper ends thereof; and
   a flange on each additional sleeve adjacent respective lower ends thereof for selectable engagement with said first sleeve aperture or a respective additional sleeve aperture.

15. An apparatus for use in conjunction with a baby stroller and adapted to support a cooling device a distance from said stroller, said apparatus comprising:
   an elongate first support rod having opposed first and second ends, said first support rod defining a slot extending longitudinally therealong between points spaced from said first and second ends;
   a first clamp adapted to removably couple said first support rod to a frame member of a baby stroller;
   a fastener coupled to said first clamp and extending through said slot for slidably moving said first clamp therealong, said fastener adapted to releasably hold said first clamp at a user-selected position along said slot for engagement with said frame member;
   a support assembly having a first sleeve pivotally coupled to said second end of said first support rod and a plurality of additional sleeves telescopically received in said first sleeve;
   means for holding said additional sleeves in user-selected positions relative to respective adjacent additional sleeves or said first sleeve;
   a second support rod having a first end coupled to an upper end of said additional sleeves and a second end, said second support rod being vertically displaced from said first support rod; and
   a second clamp pivotally coupled to said second end of said second support rod and adapted to removably receive a cooling device, whereby to selectively cool a baby seated in said stroller.

16. The apparatus as in claim 15 further comprising a third clamp pivotally coupled to said first support rod adjacent said first end thereof and adapted to removably couple said first support rod to another frame member of said baby stroller.

17. The apparatus as in claim 16 wherein:
   said first clamp includes a first base threadably coupled to said fastener and a first C-shaped annulus pivotally coupled to said first base for rotation about an imaginary axis normal to said first support rod;

said second clamp includes a second base pivotally coupled to said second end of said second support rod and a second C-shaped annulus fixedly attached to said second base for rotation about an imaginary axis established by said second support rod; and said third clamp includes a third base fixedly attached to said first support rod and a third C-shaped annulus pivotally coupled to said third base for rotation about an imaginary axis normal to said first support rod.

18. The apparatus as in claim 15 wherein said holding means includes:

an aperture defined by said first sleeve adjacent an upper end thereof;

an aperture defined by each additional sleeve adjacent respective upper ends thereof; and a flange on each additional sleeve adjacent respective lower ends thereof for selectable engagement with said first sleeve aperture or a respective additional sleeve aperture.

* * * * *